United States Patent [19]

Handa et al.

[11] Patent Number: 4,965,098
[45] Date of Patent: * Oct. 23, 1990

[54] TWO-TONE PAINT FILM

[75] Inventors: Jun-ichi Handa, Toyota; Hiroshi Ito, Ichinomiya; Taketoshi Minohara, Toyota, all of Japan

[73] Assignee: Toyota Jidosha Kabushiki Kaisha, Toyota, Japan

[*] Notice: The portion of the term of this patent subsequent to Sep. 4, 2007 has been disclaimed.

[21] Appl. No.: 379,557

[22] Filed: Jul. 13, 1989

[30] Foreign Application Priority Data

Jul. 19, 1988 [JP] Japan .................. 63-179952

[51] Int. Cl.$^5$ .............. B32B 5/16; B60R 13/04; C09D 5/29
[52] U.S. Cl. ..................... 428/203; 428/195; 428/208; 428/206; 428/212; 428/324; 428/328; 428/363; 428/468; 428/31; 428/913.3; 523/171; 523/216
[58] Field of Search ............... 523/171, 216; 428/195, 428/208, 206, 212, 324, 328, 363, 468, 31, 913.13, 203

[56] References Cited

U.S. PATENT DOCUMENTS

| | | | |
|---|---|---|---|
| 480,371 | 8/1892 | Mandigo | 428/206 X |
| 3,058,931 | 10/1962 | Pettz | 523/171 |
| 3,843,571 | 10/1974 | Fitzgerald | 523/171 X |
| 4,134,776 | 1/1979 | Rieger et al. | 523/216 X |
| 4,527,507 | 7/1985 | Sawai et al. | 118/314 |
| 4,565,581 | 1/1986 | Bernhard | 428/363 X |
| 4,814,208 | 3/1989 | Miyazaki et al. | 427/402 |
| 4,849,283 | 7/1989 | Porter, Jr. et al. | 425/323 |

FOREIGN PATENT DOCUMENTS

| | | | |
|---|---|---|---|
| 96046 | 8/1978 | Japan . | |
| 0066978 | 5/1980 | Japan | 523/216 |
| 161055 | 4/1982 | Japan . | |
| 0081260 | 5/1985 | Japan | 523/216 |
| 93872 | 5/1986 | Japan . | |
| 225264 | 7/1986 | Japan . | |
| 265795 | 11/1987 | Japan . | |
| 265796 | 11/1987 | Japan . | |
| 3084935 | 4/1988 | Japan | 428/206 |
| 347888 | 5/1931 | United Kingdom | 428/363 |

Primary Examiner—Ellis P. Robinson
Assistant Examiner—William P. Watkins, III
Attorney, Agent, or Firm—Finnegan, Henderson, Farabow, Garrett & Dunner

[57] ABSTRACT

A two-tone paint film comprises a first paint film and a second paint film formed adjacent to the first paint film, each of the first paint film and the second paint film including pigment comprising a ceramic flake substrate, a transparant inorganic thin film layer formed on the surface of the substrate, and glittering portions having metallic luster comprising metal dots or alloy dots formed on the surface of the thin film layer. The pigment of the first paint film has a different ratio of the total areas of the glittering portions to the entire surface area of the thin film layer from the pigment of the second paint film. Thus, brightness of the two paint films are reversed between a view at the front and a view in an oblique angle.

24 Claims, 2 Drawing Sheets

TWO-TONE PAINT FILM

BACKGROUND OF THE INVENTION

The present invention relates to a two-tone metallic paint film to be formed on surfaces of an automobile body.

A two-tone paint film, formed by separately applying two different colors of paints on adjacent areas in view of design has been known as an automobile body paint film. The two-tone paint film includes, for example, one which divides sides of an automobile body into upper and lower parts by two different colors, and one which adds marks or designs of different color on a paint film.

Metallic paint film which contains flakes of aluminum powder are well known. The aluminum powder, however, is not high in brightness, and is hard to give light tone. Recently, the use of a metallic paint film containing mica powder coated with titanium dioxide (hereinafter referred to as titanized mica) has been taken into consideration. The metallic paint film containing titanized mica is high in brightness, and can give light tone. It also has a peculiar rainbow luster.

When using the above-mentioned conventional pigments, the two-tone paint film is generally formed by making tones of two paints differ from each other. For example, it is achieved by using different kinds of coloring pigments or metallic pigments. Japanese Unexamined Patent Publication (KOKAI) No. 93872/1986 also discloses a method of forming a two-tone paint film by providing beforehand, under a mica-contained metallic paint film, color base layers wherein different coloring paints are adjacently applied.

In the above-mentioned conventional metallic two-tone paint film, the two paint colors may give different brightness depending on view angles, but are hardly reversed in brightness depending on view angles.

SUMMARY OF THE PRESENT INVENTION

It is an object of the present invention to provide a two-tone paint film having a novel design effect that brightness of the two paint colors are reversed depending on view angles.

The present inventors earnestly studied titanized mica and filed Japanese Patent Application No. 265796/1987 about a metallic paint film having a good flip-flop charateristic. The flip-flop charateristic means a contrast between brightness when viewed at the front and that when viewed in an oblique angle. The metallic paint film having a good flip-flop characteristic has a very novel design effect compared to the conventional metallic paint film.

The metallic paint film according to Japanese Patent Application No. 265796/1987 utilizes a pigment disclosed in Japanese Patent Application No. 265795/1987, which was filed by the same applicant as the present application. As shown in FIG. 5, the novel pigment comprises a ceramic flake substrate 100, a thin film layer 101 formed on the substrate 100, for example, a titanium dioxide thin film layer in the case of titanized mica pigment, and glittering portions 102 comprising metal dots or alloy dots formed on the surface of the thin film layer 101.

The present inventors have further studied the relation between the total areas of the glittering portions in the dots shape of the novel pigment and design effect. The present inventors have found that when the ratio of the total areas of the glittering portions to the entire surface area of the titanium dioxide layer increases, the brightness of the paint film containing the novel pigment when viewer at the front increases, while the brightness when viewed in an oblique angle decreases. The present invention has been developed on the base of the above findings.

The two-tone paint film of the present invention comprises a first paint film and a second paint film formed adjacent to the first paint film, each of the first paint film and the second paint film including pigment comprising a ceramic flake substrate, an inorganic thin film layer formed on the surface of the substrate, and glittering portions comprising metal dots or alloy dots formed on the surface of the thin film layer, and the pigment of the first paint film and the pigment of the second paint film have different ratios of the total areas of the glittering portions to the entire surface area of the thin film layer of the pigment from each other.

The pigment used for the present invention is hereinafter described in detail. The pigment comprises a substrate, a thin film layer and glittering portions.

The substrate is a ceramic having a scale-like, or flake, and may be, for example, natural mica such as white mica, black mica and gold mica, synthetic mica, or molybdenum disulfide. The substrate has a scale-like shape and is about 500 to 1000 Å in mean thickness and preferably has a diameter of about 3 to 50 $\mu$m.

The thin film layer is made of an inorganic compound and generally formed on the entire surface of the substrate. The material for the thin film layer can be selected among titanium dioxide, iron oxide, aluminium hydroxide, chromium dioxide, and like transparent inorganic compounds in accordance with a desired pigment hue. Titanium dioxide which has a high index of refraction is particularly preferred as the thin film layer.

The thin film layer has light permeability. The thin film inorganic layer is transparent and the light which passed through the thin film layer is reflected at the interface between the thin film layer and the substrate, and produces light interference with the light reflected on the surface of the thin film layer by phase difference. Therefore, strength of the light interference differs by thickness of the thin film layer, and variety of the thickness and material of the inorganic compound layer produces various interference colors.

The glittering portions are metal or alloy dots formed on the surface of the thin film layer. Light reflected on the glittering portions gives metallic luster, and light reflected on the portions other than the glittering portions gives interference color. The glittering portions having metallic luster are selected from a metal such as silver, gold, copper, palladium, nickel, cobalt, and an alloy such as a nickel-phosphorus alloy, a nickel-boron alloy, a nickel-cobalt-phosphorus alloy, a nickel-tungsten-phosphorus alloy, a cobalt-phosphorus alloy, and a silver-gold alloy. The ratio of the total areas of the glittering portions in the dots shape to the entire surface area of the thin film layer including the surfaces covered with the glittering portions (hereinafter referred to as a brightness ratio) is desirably in a range from 0.0005 to 0.95. The range, number, distribution and size of the glittering portions can be selected at discretion within this range.

The major feature of the present invention is that the brightness ratio of the above-mentioned novel pigment contained in the first paint film and that contained in the second paint film are different from each other.

A big difference in bright ratio is preferred because the brigtness of the first paint film and that of the second paint film are clearly reversed depending on view angles. The above novel pigments contained in the first paint film and the second paint film may be of the same or different kind. The amount of the novel pigments are optionally selected as long as performance of the paint films are not damaged. The novel pigments are preferably of a similar hue. When the difference in hue is too big, the reverse of the brightness depending on view angles might be unclear due to the hue difference.

The first paint film and the second paint film are formed adjacent to each other, in order to produce a two-tone paint film. "Adjacent" is a concept including a state that the ends of the two films contact each other and a state that one paint film is overlaid on the other paint film surface. In the latter case, a clear paint film may be formed between the two films.

Vehicles constituting the first paint film and the second paint film are not particularly specified; They may be resins constituting conventional paint films such as an acrylic-melamine resin, an acrylic-urethane resin, and polyester resin. A clear paint film may be formed on the surfaces of the first paint film and/or the second paint film, and an intermediate paint film is usually formed under the first paint film and/or the second paint film.

In the two-tone paint film of the present invention, the brightness ratios of the above-mentioned novel pigments contained in the first paint film and the second paint film are different from each other. As described in the above, the novel pigment has a feature that as the brightness ratio increases, the brightness when viewed at the front increases but the brightness when viewed in an oblique angle decreases. Therefore, when the brightness ratios of the novel pigments contained in the first paint film and the second paint film differ from each other, the paint film containing the novel pigment with a higher brightness ratio has a higher brightness when viewed at the front and a lower brightness when viewed in an oblique angle, than the other paint film. Namely, the brightness of the first paint film and the second paint film are reversed depending on view angles. This phenomenon is explained by the following mechanism: When viewed at the front, the paint film containing the novel pigment with a higher brightness ratio looks brighter because the glittering portions strongly reflect light, while when viewed in an oblique angle, the paint film containing the novel pigment with less glittering portions, i.e., a lower brightness ratio looks brighter, because the reflection at the glittering portions is weaker and the interference color of the thin film layer is exhibited more clearly.

Thus, in the two-tone paint film of the present invention, the brightness of the first paint film and that of the second paint film are reversed depending on view angles, and a novel and excellent design effect is attained. In addition, when the present invention is applied to painted identifying marks, signs or other decorations, the marks look bright or dark depending on view angles, and therefore, can offer a characteristic design.

BRIEF DESCRIPTION OF THE DRAWINGS

Other objects and features of the invention will become apparent to those skilled in the art as the disclosure is made in the following description of a preferred embodiment of the invention, as illustrated in the annexed drawings, in which.

DETAILED DESCRIPTION OF THE PREFERRED EMBODIMENTS

[The First Preferred Embodiment]

Figure 1:
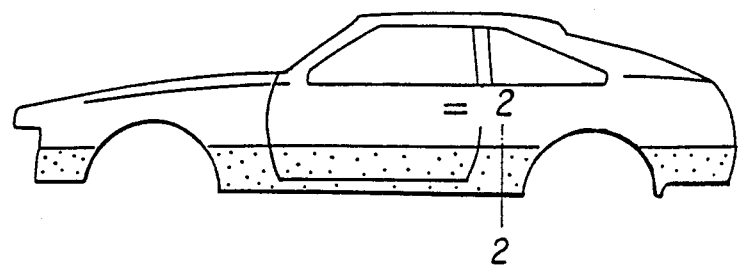
FIG. 1 is a front view of an automobile side body having a two-tone paint film according to a first preferred embodiment of the present invention.
Figure 2:
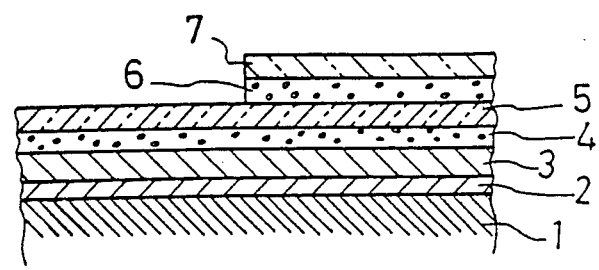
FIG. 2 is a cross-sectional view along line 2—2 of FIG. 1.

As shown in FIG. 2, a two-tone paint film of the first preferred embodiment comprised an electrodeposition paint film 2 formed on the surface of a steel sheet 1, an intermediate paint film 3 formed on the surface of the electrodeposition paint film 2, a first paint film 4 formed on the surface of the intermediate paint film 3, a clear paint film 5 formed on the surface of the first paint film 4, a second paint film 6 formed on a part of the surface of the clear paint film 5, and a clear paint film 7 formed on the surface of the second paint film 6.

(EXAMPLE A)

The first paint film 4 and the clear paint film 5 were formed as follows. First, glittering portions were formed by plating silver in scattered dots on a surface of titanized mica (Iriodin No. 9103, produced by Merck Japan Co., Ltd.) by electroless plating The amount of plated silver was 1.6% by weight based on 100% by weight of titanized mica. The brightness ratio was 0.022. The novel pigment thus obtained was added to a mixed solution of acrylic resin and melamine resin at 10% by weight of pigment concentration, and thoroughly stirred to form the first metallic paint.

Next, the first metallic paint was applied by spraying at a thickness of 15–20 μm when dried on the automobile body on which the electrodeposition paint film 2 and the intermediate paint film 3 were formed beforehand Further, a clear paint ("AC-11" produced by AISIN KAKO KABUSHIKI KAISHA) was applied by spraying thereon in a wet-on-wet manner at a thickness of 30 μm when dried. Then it was heated for baking and drying at 140° C. for 23 minutes. Thus, the first paint film 4 and the clear paint film 5 were integrally formed.

Then, the surface of the clear paint film 5 was masked except that the lower part of the automobile body was revealed. The second paint film was prepared with the same pigment in the same manner as the first paint film except that the amount of plated silver was 6.4% by weight and the brightness ratio was 0.089. The second metallic paint was applied by spraying on the surface of the revealed clear paint film 5 at a thickness of 15–20 μm when dried. Then, the clear paint ("AC-11" produced by AISIN KAKO KABUSHIKI KAISHA) was applied by spraying thereon in a wet-on-wet manner at a thickness of 30 μm when dried. Then, it was baked and dried by heating at 140° C. for 23 minutes. Thus, the second paint film 6 and the clear paint film 7 were integrally formed.

The obtained two-tone paint film was evaluated about the brightness of the two colors and the design effect. The results are shown in Table 1. Brightness La at an angle of 15 degrees and brightness Lb at an angle of 85 degrees, respectively away from a light which was vertically incident on the paint film were measured by employing a colorimeter produced by Suga Testing Machine Co., Ltd.

(EXAMPLES B, C)

Two-tone paint films of Examples B and C were prepared in the same manner as Example A except that the amounts of plated silver of the novel pigment contained in the first paint film 4 and the second paint film 6 were changed as shown in Table 1. The brightness and design of them were evaluated in the same manner as Example A. The results are shown in Table 1.

TABLE 1

| Example | | plated silver (wt %) | La | Lb | Design effect |
| --- | --- | --- | --- | --- | --- |
| A | 1st film | 1.6 | 98.2 | 15.3 | excellent |
|   | 2nd film | 6.4 | 101.6 | 10.1 | |
| B | 1st film | 1.6 | 98.2 | 15.3 | good |
|   | 2nd film | 3.8 | 100.5 | 12.4 | |
| C | 1st film | 3.8 | 100.5 | 12.4 | good |
|   | 2nd film | 6.4 | 101.6 | 10.1 | |

(Evaluation)

As apparent from Table 1, brightness La of the second paint film 6 was higher than that of the first paint film 4, but brightness Lb of the second paint film 6 was lower than that of the first paint film 4. Namely, the second paint film 6 looked brighter when viewed at the front, but the first paint film 4 looked brighter when viewed in an oblique angle; The brightness of the first paint film 4 and that of the second paint film 6 were reversed depending on view angles. Thus, the examples of the present invention had an excellent design effect which could not be observed by the conventional paint films.

The second paint film 6 had a higher hiding power than the first paint film 4 because the second paint film 6 contained the more amount of silver plated on the pigment. Since the first paint film 4 could not be observed through the second paint film 6, the above effect was enhanced at the maximum extent.

[The Second Preferred Embodiment]

Figure 3:
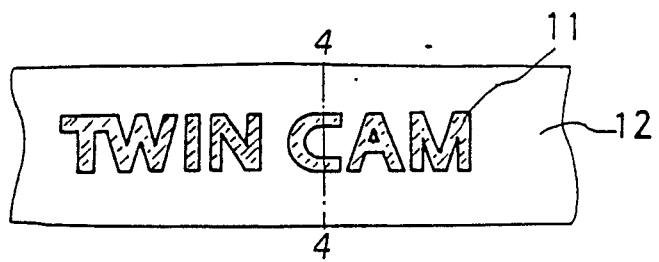
FIG. 3 is a front view of a part of an automobile body having a two-tone paint film according to a second preferred embodiment of the present invention.
Figure 4:
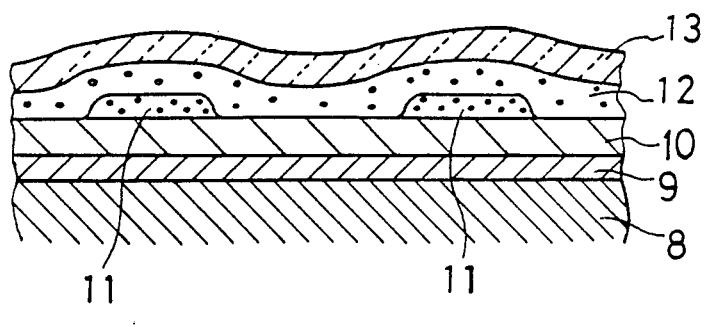
FIG. 4 is a cross-sectional view along line 4—4 of FIG. 3.
Figure 5:
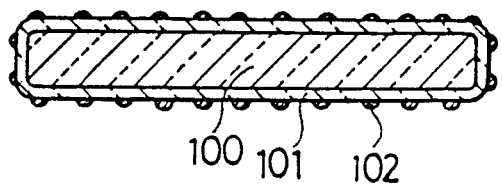
FIG. 5 is a schematic sectional view of a novel pigment employed in the preferred embodiments of the present invention.

In this preferred embodiment, the two-tone paint film of the present invention was applied to a mark formed on an automobile side body. As shown in FIG. 3, characters constituted by a first paint film 11 stood out from a second paint film 12. The two-tone paint film of the second preferred embodiment comprised, as shown in FIG. 4, an electrodeposition paint film 9 formed on the entire surface of the automobile body 8, an intermediate paint film 10 formed on the electrodeposition paint film 9, the first paint film 11 formed on a part of the surface of the intermediate paint film 10, the second paint film 12 formed on the entire surface of the automobile body including the surface of the first paint film 11, and a clear paint film 13 formed on the surface of the second paint film 12.

TABLE 2

| Example No. | Composition | La | Lb |
| --- | --- | --- | --- |
| A1 | Merck Pearl Mica No. 9103 + 1.6 wt % silver plating | 98.2 | 15.3 |
| A2 | Merck Pearl Mica No. 9103 + 3.8 wt % silver plating | 100.5 | 12.4 |
| A3 | Merck Pearl Mica No. 9103 + 6.4 wt % silver plating | 101.6 | 10.1 |
| B1 | Merck Pearl Mica No. 101S + 1.6 wt % silver plating | 97.1 | 14.4 |
| B2 | Merck Pearl Mica No. 101S + 3.8 wt % silver plating | 99.6 | 12.8 |
| B3 | Merck Pearl Mica No. 101S + 6.4 wt % silver plating | 100.9 | 10.7 |
| C1 | Merck Pearl Mica No. 9225 + 1.6 wt % silver plating | 86.4 | 12.1 |
| C2 | Merck Pearl Mica No. 9225 + 3.8 wt % silver plating | 89.9 | 10.9 |
| C3 | Merck Pearl Mica No. 9225 + 6.4 wt % silver plating | 93.5 | 9.8 |
| D1 | Merck Pearl Mica No. 9103 | 98.6 | 56.7 |
| D2 | Merck Pearl Mica No. 101S | 99.3 | 59.2 |
| D3 | Merck Pearl Mica No. 9225 | 88.2 | 52.3 |

First, with placing a board having character-shaped holes on the intermediate paint film 10, the first metallic paint containing the pigment shown in Table 2 was applied by spraying to a part to be decorated. It was then baked and dried in the same manner as the first preferred embodiment, to form the first paint film 11. Next, on the entire automobile side body, the second metallic paint containing the pigment shown in Table 2 was applied and further the clear paint was applied in a wet-on-wet manner. It was then baked and dried, to form the second paint film 12 and the clear paint film 13 integrally.

The compositions of the pigments and brightness La and Lb of the paint films formed by the metallic paints prepared from the same pigments are shown in Table 2. Three pigments produced by Merck Japan Co., Ltd. (Pearl mica Nos. 9103, 101S and 9225) were used as titanized mica of the second preferred embodiment. Silver was plated at 1.6% by weight, 3.8% by weight, and 6.4% by weight respectively on each titanized mica in dots shape. Table 2 also shows titanized mica without silver plating (Comparative Example Nos. D1–D3) for the purpose of comparison.

As apparent from Table 2, as the amount of plated silver increases, brightness La increases and brightness Lb decreases in all the three titanized mica.

TABLE 3

| Example No. | 1st paint film | 2nd paint film | Design effect |
| --- | --- | --- | --- |
| 1 | A2 | A1 | |
| 2 | A3 | A2 | |
| 3 | A3 | A1 | |
| 4 | B2 | B1 | |
| 5 | B3 | B2 | |
| 6 | B3 | B1 | |
| 7 | C2 | C1 | |
| 8 | C3 | C2 | |
| 9 | C3 | C1 | |
| 10 | A3 | B1 | |
| 11 | B3 | A1 | |
| 12 | C3 | A1 | |
| 13 | C3 | B1 | Δ |
| C1 | D1 | D2 | X |
| C2 | D2 | D3 | X |
| C3 | D3 | D1 | X |

Metallic paints were prepared from the respective pigments, and two-tone paint films shown in FIG. 4 were produced with combinations shown in Table 3. The design was evaluated by the visual inspection, and the results are also shown in Table 3. Criterion for evaluation was as follows:

⊚ ... A brightness reversing effect was observed and the design was very interesting.
○ ... A brightness reversing effect was observed.
□ ... A brightness reversing effect was weakened and the design lacked in interest.
Δ ... A brightness reversing effect was hardly observed and the design lacked in interest.
X ... No brightness reversing effect was observed.

The reason why the first paint film 11 contained the novel pigment with the more amount of silver plated is that in the opposite case, the hiding power of the second paint film 12 is so strong that the first paint film 11 cannot be observed through the second paint film 12. In the present case, the first paint film 11 can be observed through the second paint film 12, and the brightness reversing effect can be exhibited.

As clearly shown in Table 3, all the examples of the present invention showed the superior design effect than the comparative examples of the titanized mica. Examples 12 and 13 showed a little effect of reversing brightness by view angles. It was because the hues of the first paint film 11 and that of the second paint film 12 differed from each other due to the different pigment hues, and the hue difference negated the effect produced by the difference in the amount of plated silver. Therefore, it is preferable that the pigments used in the two-tone paint films of the present invention are of a similar hue.

In summary, in the second embodiment of the present invention, the first paint film 11 looked brighter and clearer and the second paint film 12 looked to be back and darker when viewed at the front, and the second paint film 12 looked brighter and the first paint film 11 looked to be back and darker when viewed in an oblique angle The two-color paint film of the second preferred embodiments offered different designs depending on view angles, which could not be achieved by the conventional paint films.

What is claimed is:

1. A two-tone paint film, comprising a first paint film and a second paint film formed adjacent to said first paint film,
   each of said first paint film and said second paint film including pigment comprising a ceramic flake-like substrate, a transparent inorganic thin film layer formed on the surface of said substrate, and glittering portions having metallic luster comprising metal dots or alloy dots formed on the surfaces of said thin film layer, and
   said pigment of said first paint film and said pigment of said second paint film having different ratios of the total areas of said glittering portions to the entire surface area of said thin film layer from each other.

2. A two-tone paint film according to claim 1, wherein each of said first paint film and said second paint film has a pigment of 0.0005 to 0.95 in the ratio of the total areas of said glittering portions to the surface area of said thin film layer.

3. A two-tone paint film according to claim 1, wherein the pigment of said first paint film and the pigment of said second paint film are of a similar hue.

4. A two-tone paint film according to claim 1, wherein said second paint film is partially overlaid on said first paint film, and the pigment of said second paint film has a higher ratio of the total area of said glittering portions to the entire surface area of said thin film layer from the pigment of said first paint film.

5. A two-tone paint film according to claim 1, wherein said first paint film is partially formed under said second paint film, and the pigment of said first paint film has a higher ratio of the total areas of said glittering portions to the entire surface area of said thin film layer than the pigment of said second paint film.

6. A two-tone paint film according to claim 5, wherein said first paint film is in the form of a mark.

7. A two-tone paint film according to claim 1, wherein said ceramic flake-like substrate of each pigment of said first paint film and said second paint film comprises one of natural mica, synthetic mica, and molybdenum disulfide ($MoS_2$).

8. A two-tone paint film according to claim 1, wherein said inorganic thin film layer of each pigment of said first paint film and said second paint film comprises at least one of titanium dioxide ($TiO_2$), iron oxide ($Fe_2O_3$), aluminum hydroxide ($Al(OH)_3$), and chromium hydroxide ($Cr(OH)_3$).

9. A two-tone paint film according to claim 1, wherein said glittering portions of each pigment of said first paint film and said second paint film are selected from the group consisting of silver (Ag), gold (Au), copper (Cu), palladium (Pd), nickel (Ni), cobalt (Co), a nickel-phosphorus (Ni-P) alloy, a nickel-boron (Ni-B) alloy, a nickel-cobalt-phosphorus (Ni-Co-P) alloy, a nickel-tungsten-phosphorus alloy (Ni-W-P) alloy, and a cobalt-phosphorus (Co-P) alloy, and a silver-gold (Ag-Au) alloy.

10. An article having a two-tone paint film comprising a first paint film and a second paint film formed adjacent to said first paint film,
    each of said first paint film and said second paint film including pigment comprising a ceramic flake-like substrate, a transparent inorganic thin film layer formed on the surface of said substrate, and glittering portions having metallic luster comprising metal dots or alloy dots formed on the surfaces of said thin film layer, and
    said pigment of said first paint film and said pigment of said second paint film having different ratios of the total areas of said glittering portions to the surface area of said thin film layer from each other.

11. An article according to claim 10, wherein each of said first paint film and said second paint film has a pigment of 0.0005 to 0.95 in the ratio of the total areas of said glittering portions to the entire surface area of said thin film layer.

12. An article according to claim 10, wherein the pigment of said first paint film and the pigment of said second paint film are of a similar hue.

13. An article according to claim 10, wherein said second paint film is partially overlaid on said first paint film, and the pigment of said second paint film has a higher ratio of the total area of said glittering portions to the entire surface area of said thin film layer from the pigment of said first paint film.

14. An article according to claim 10, wherein said first paint film is partially formed under said second paint film, and the pigment of said first paint film has a higher ratio of the total areas of said glittering portions to the entire surface area of said thin film layer than the pigment of said second paint film.

15. An article according to claim 14, wherein said first paint film is in the form of an identifying mark.

16. An automobile body having a two-tone paint film comprising a first paint film and a second paint film formed adjacent to said first paint film,
   each of said first paint film and said second paint film including pigment comprising a ceramic flake-like substrate, a transparent inorganic thin film layer formed on the surface of said substrate, and glittering portions having metallic luster comprising metal dots or alloy dots formed on the surfaces of said thin film layer, and
   said pigment of said first paint film and said pigment of said second paint film having different ratios of the total areas of said glittering portions to the entire surface area of said thin film layer from each other.

17. An automobile body according to claim 16, wherein each of said first paint film and said second paint film has a pigment of 0.0005 to 0.95 in the ratio of the total areas of said glittering portions to the entire surface area of said thin film layer 18. An automobile body according to claim 16, wherein the pigment of said first paint film and the pigment of said second paint film are of a similar hue.

19. An automobile body according to claim 16, wherein said second paint film is partially overlaid on said first paint film, and the pigment of said second paint film has a higher ratio of the total area of said glittering portions to the entire surface area of said thin film layer from the pigment of said first paint film.

20. An automobile body according to claim 19, wherein said first paint film is formed on the entire automobile body, and said second paint film is formed on said first paint film at a lower part of the automobile body.

21. An automobile body according to claim 19, which comprises a steel sheet, an electrodeposition paint film formed on surface of said steel sheet, an intermediate paint film formed on surface of said electrodeposition paint film, said first paint film formed on surface of said intermediate paint film, a clear paint film formed on surface of said first paint film, said second paint film formed on a part of surface of said clear paint film, and a clear paint film formed on surface of said second paint film.

22. An automobile body according to claim 16, wherein said first paint film is partially formed under said second paint film, and the pigment of said first paint film has a higher ratio of the total areas of said glittering portions to the entire surface area of said thin film layer than the pigment of said second paint film.

23. An automobile body according to claim 22, wherein said first paint film is in the form of an identifying mark, and said second paint film is formed on the entire automobile body including on said mark.

24. An automobile body according to claim 23, which comprises a steel sheet, an electrodeposition paint film formed on the entire surface of said steel plate, an intermediate paint film formed on surface of said electrodeposition paint film, said first paint film formed on a part of surface of said intermediate paint film, a second paint film formed on surface of said intermediate paint film and said first paint film, and a clear paint film formed on said second paint film.

* * * * *